J. H. LEE.
Coffee Pot.
No. 60,204.
Patented Dec. 4, 1866.
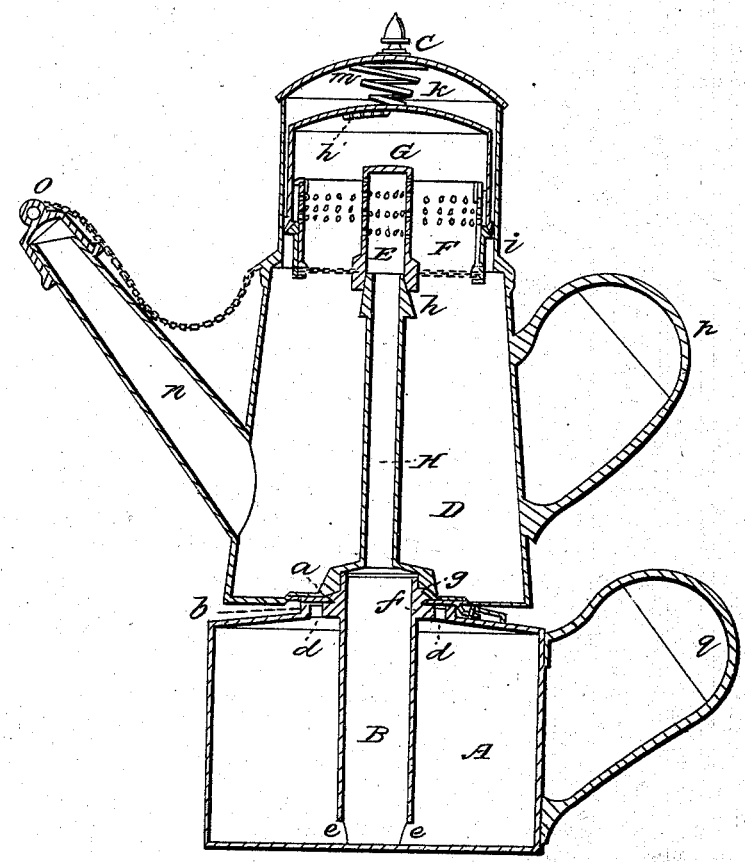
Witnesses:
Samuel N. Piper
George Andrews.
Inventor:
James H. Lee.
by his Atty
R. H. Eddy

United States Patent Office.

IMPROVEMENT IN COFFEE-POTS.

JAMES H. LEE, OF CHARLESTOWN, MASSACHUSETTS.

*Letters Patent No. 60,204, dated December 4, 1866; antedated November 22, 1866.*

SPECIFICATION.

TO ALL PERSONS TO WHOM THESE PRESENTS SHALL COME:

Be it known that I, JAMES H. LEE, of Charlestown, in the county of Middlesex, and State of Massachusetts, have invented an Improved Cafetière, or apparatus for making decoctions or infusions of coffee or other matters; and I do hereby declare the same to be fully described in the following specification, and represented in the accompanying drawing, which denotes a vertical section of it.

In such drawing, A denotes a boiler or close vessel, provided with a neck, or valve-seat $b$, to support a flexile valve or washer, $a$, fastened to a staple, $c$. The said valve-seat has one or more openings, $d$, leading through it into the vessel A. The valve-seat is concentric with a tube B, which has openings $e\ e$, leading out of it near its lower end, and extends down into the boiler A to its bottom. The tube B projects above the top of the boiler a short distance, and has a male screw, $f$, cut on it for the purpose of securing upon it a coffee-pot D, which at bottom is provided with a female screw socket $g$, to screw upon the tube B, and so that the bottom of the pot D may be made to fit closely down upon the washer or valve $a$, and cause it to close the openings $d\ d$. The screws also allow of the detachment of the coffee-pot and boiler, as occasion may require. Extending up from the said part $g$, and opening into the tube B, is a tube H, which is arranged concentrically within the pot D, and is surmounted by another tube E, which encompasses and fits upon it, as shown at $h$. The tube E is closed at top, is foraminous in its sides, and extends up through a coffee-holder, or vessel, F, which is supported in position by being at its bottom fixed to the tube E. A safety-bell cap G, extends above and about the coffee-holder F, and is fitted to it by a tapering joint, as seen at $i\ i$. Another such bell-cover C encompasses the safety-bell cap G, rises up from the mouth of the pot D, and should be fitted to such mouth by means of a lock-joint, or by being screwed into it. There should be a space $k$ between the cover G and the cap or cover C, and there may be a small hole $h'$ in the top of the cover G, or its hole may be covered with wire gauze, the hole being for the escape of steam from the case G. A spring $m$, attached to the top of the cover C, presses the cap G down upon its seat $i$. The pot D has a spout $n$, provided with a close-fitting cover or cap, $o$. There is also a handle $p$ to the pot D, and another handle $q$ to the boiler A, the same being arranged as represented. In using the coffee-preparing apparatus, the ground coffee is to be placed in the receiver F, and the water in the boiler A. While the water may be in a boiling state, it will generate steam, which, pressing on the water, will force it into and through the pipe B, and thence through the pipes H and E, and into and upon the coffee in the receptacle F, through which it will percolate and fall into the coffee-pot D. The safety-cap G will allow the coffee to swell, and will rise under the pressure of the coffee, should it swell so much as to overcome the pressure at the spring $m$. For convenience and economy, it is advantageous to have the coffee-holder F in connection with the coffee-pot, after the latter may have been detached from the boiler, and while in use on a breakfast table. This can be effected by my present cafetière. The coffee-making apparatus recently patented by me, does not admit of such, on account of the tube which proceeds down from the coffee-holder going below the coffee-pot. In my present apparatus I do not apply one single tube to extend from the coffee-holder down into the boiler, but instead thereof, make use of three separate tubes, B, H, and E, that is, one to each of the vessels A, D, and F, the tube H being extended nearly if not quite up to the top or mouth of the coffee-pot. This enables me not only to detach the coffee-holder from the coffee-pot, but the latter from the boiler, as occasion may require. As the boiler has to be supplied with water through the tube B, I employ the opening $d$, and the cap or washer-valve $a$, and seat $b$, in order that air may escape from the boiler during the process of filling it with water, such valve being subsequently closed down upon the seat by the screws at $f$ and $g$ forcing the bottom of the coffee-pot down upon the valve.

I claim as my invention, the combination and arrangement of the tubes B and H, the boiler A, the coffee-pot D, and the vessel F.

I also claim the combination and arrangement of the tubes B, H, and E, the boiler A, the coffee-pot D, and the vessel F.

I also claim the combination of the safety-bell cover G, and its spring $m$, the cover C, the coffee-holder F, the pipes H, E, B, or their equivalents, the coffee-pot D, and the boiler A.

I also claim the combination and arrangement of the seat $b$, one or more openings $d$, the flexile cap or washer $a$, and the screws $f$, $g$, with the coffee-pot D, the boiler A, and the tube B, applied to such boiler, and opening into it as specified.

JAS. H. LEE.

Witnesses:
R. H. EDDY,
F. P. HALE, Jr.